(12) United States Patent
Jones (10) Patent No.: US 7,252,583 B1
(45) Date of Patent: Aug. 7, 2007

(54) EASY BIG GAME FIELD DRESSING APPARATUS

(76) Inventor: Ronald T. Jones, 84725 Hwy 40 West, Craig, CO (US) 81625

( * ) Notice: Subject to any disclaimer, the term of this patent is extended or adjusted under 35 U.S.C. 154(b) by 0 days.

(21) Appl. No.: 11/413,251

(22) Filed: Apr. 28, 2006

(51) Int. Cl.
*A22B 5/10* (2006.01)

(52) U.S. Cl. .................................... 452/102

(58) Field of Classification Search ............... 119/769, 119/770, 772, 774, 776, 799, 801–804
See application file for complete search history.

(56) References Cited

U.S. PATENT DOCUMENTS

| | | | |
|---|---|---|---|
| 1,614,772 A | | 1/1927 | Bambini et al. |
| 1,788,656 A | | 1/1931 | Brown |
| 1,883,598 A | * | 10/1932 | Dahl ........................... 119/803 |
| 2,906,021 A | | 9/1959 | Cromoga |
| 3,751,761 A | | 8/1973 | Weiland |
| 3,949,514 A | * | 4/1976 | Ramsey ........................ 43/87 |
| 4,198,751 A | | 4/1980 | Egbert |
| 4,461,080 A | | 7/1984 | Olson |
| 4,528,751 A | | 7/1985 | Bremer et al. |
| 4,561,148 A | | 12/1985 | Bonuchi et al. |
| 4,607,432 A | | 8/1986 | Montgomery |
| 4,682,417 A | | 7/1987 | Henslin et al. |
| 4,707,920 A | | 11/1987 | Montgomery |
| 4,763,416 A | | 8/1988 | Copeland |
| 5,386,635 A | | 2/1995 | Sheba |
| 5,453,042 A | | 9/1995 | Monson |
| 5,490,332 A | | 2/1996 | Levin |
| 5,549,521 A | | 8/1996 | van den Nieuwelaar et al. |
| 5,690,548 A | * | 11/1997 | Jones et al. ................. 452/160 |
| 5,752,731 A | * | 5/1998 | Crone .......................... 294/24 |
| 5,979,106 A | * | 11/1999 | Butler ........................... 43/87 |
| 6,012,416 A | * | 1/2000 | Lammers ..................... 119/804 |
| 6,193,595 B1 | | 2/2001 | Volk et al. |
| 6,244,949 B1 | * | 6/2001 | Moody ........................ 452/122 |
| 6,280,312 B1 | | 8/2001 | Elrod et al. |
| 6,364,758 B1 | | 4/2002 | Nielsen et al. |
| 6,598,298 B1 | | 7/2003 | Bartlett |
| 6,811,478 B2 | | 11/2004 | van den Nieuwelaar et al. |

\* cited by examiner

*Primary Examiner*—Thomas Price
(74) *Attorney, Agent, or Firm*—Barber Legal; Craig Barber (57) ABSTRACT

A big game dressing device has a handle portion having two ends: a first end with a grip attachment to aid gripping it with a hand, and a second end having a windpipe loop dimensioned and configured to engage around the windpipe of a big game animal to be gutted. The device may be extendible, may have a handle or the like at the first end, and may be made of a strong material. In use, the body cavity of the big game animal is cut open from top to bottom and the windpipe of the animal is cut across. The windpipe loop is then placed over the end of the windpipe and the device is pulled, assisting in the removal of the visceral of the animal.

15 Claims, 7 Drawing Sheets

EASY BIG GAME FIELD DRESSING APPARATUS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

CROSS-REFERENCE TO RELATED APPLICATIONS

N/A

FIELD OF THE INVENTION

This invention relates generally to hunting, and specifically to methods and devices of field dressing of big game.

STATEMENT REGARDING FEDERALLY FUNDED RESEARCH

This invention was not made under contract with an agency of the US Government, nor by any agency of the US Government.

BACKGROUND OF THE INVENTION

Big game hunters are faced with the problem of dressing a kill after a successful hunt. This requires removal of the visceral of the animal from the body cavity.

Under normal practice, the big game animal (deer, elk, moose, antelope, etc) is first laid out on its back or suspended by its legs and the animal's pelvic bone and sternum are broken. Then the animal is cut open from the very bottom of the body cavity to the very top.

After this, the messy and somewhat dangerous job of removing the entrails begins. In normal practice, the hunter will insert a knife into the body cavity held in one hand while using the other hand to move the internal organs about, looking for places which may be easily cut so as to allow larger body parts to be removed: places such as ligaments, connections, tubes and so on. Needless to say, this is a bloody and unpleasant process. Worse, while the hunter is struggling with uncooperative and slippery organs, the hunter is very prone to cutting themselves on the grabbing hand with the knife held in the other hand. Even minor cuts received while the hands are inside of an animal carcass may be considered unhygienic.

Various solutions have been proposed.

A search of the USPTO collection reveals certain common types of solutions to the problem may be found in class 452 (Butchery) or class 30 (Cutlery).

One common type of solution is the modification of the knife blade, hopefully to render it more safe. Examples of this type of device include U.S. Pat. No. 1,614,772 issued Jan. 18, 1927 to A. Bambini et al, U.S. Pat. No. 1,788,656 issued Jan. 13, 1931 to R. E. Brown, U.S. Pat. No. 2,906,021 issued Sep. 29, 1959 to W. V. Cromoga, U.S. Pat. No. 4,198,751 issued Apr. 22, 1980 to Egbert is another such example, as are U.S. Pat. No. 4,607,432 issued Aug. 26, 1986 to Montgomery, U.S. Pat. No. 4,682,417 issued Jul. 28, 1987 to Henslin et al for a device useful for splitting pelvic bones, U.S. Pat. No. 4,707,920 issued Nov. 24, 1987 to Montgomery, U.S. Pat. No. 4,763,416 issued Aug. 16, 1988 to Copeland, U.S. Pat. No. 5,386,635 issued Feb. 7, 1995 to Sheba, U.S. Pat. No. 5,453,042 to Monson on Sep. 26, 1995 for another pelvic splitting device, U.S. Pat. No. 5,490,332 issued Feb. 13, 1996 to Levin, U.S. Pat. No. 5,690,548 issued to Jones et al on Nov. 25, 1997 and U.S. Pat. No. 6,280,312 issued Aug. 28, 2001 to Elrod et al.

Such knives deal with cutting implements and thus are not really relevant to the idea of securing a windpipe and pulling on it.

Another common type of solution proposes mechanical devices suitable to slaughterhouse facilities and mass production of dressed animals. Examples of this type of device include U.S. Pat. No. 4,561,148 issued Dec. 31, 1985 to Bonuchi et al, U.S. Pat. No. 5,549,521 issued Aug. 27, 1996 to van den Nieuwelaar et al and U.S. Pat. No. 6,811,478 issued Nov. 2, 2004 in the name of the same inventor (van den Nieuwelaar et al) and also U.S. Pat. No. 6,193,595 issued Feb. 27, 2001 to Volk et al.

Such factory equipment devices are not relevant to hunting and teach away from items a hunter might usefully carry hunting.

Other patents show devices which may be useful to hunters in certain situations.

U.S. Pat. No. 6,598,298 to Bartlett on Jul. 29, 2003, teaches a field dressing device of the multi-tool type having claws for grabbing parts of the viscera, cutting blades and so on and so forth.

U.S. Pat. No. 3,751,761 issued Aug. 14, 1973 to Weiland teaches an eviscerating tool having a plurality of hooks and barbs thereon.

U.S. Pat. No. 4,461,080 issued Jul. 24, 1984 to Olson teaches another multi-tool device having claws and the like for grabbing animal entrails, as does U.S. Pat. No. 4,528,751 issued Jul. 16, 1985 to Bremer et al, a co-inventor with the inventor of the previous item.

U.S. Pat. No. 6,364,758 issued Apr. 2, 2002 to Nielsen et al teaches a device having worm drive actuated jaws.

These device teach away from the present invention in being large, complex devices having multiple moving parts, jaws, claws, hooks and the like.

It would be preferable to provide an extremely straightforward device of light weight and quick utility having few or no moving parts, a device capable of quick manufacture at low cost.

SUMMARY OF THE INVENTION

General Summary

The present invention teaches a big game dressing device having a handle portion having two ends. The handle portion may be a strong material able to resist a high tension pull, such as wood, metal, high strength polymers and composites and so on.

The device may have a grip attachment at a first end to aid gripping and high strength pulling the with the hands. The grip attachment may take the form of a wrist thong dimensioned and configured to slip around a person's wrist, or a knob, handle, a grip conforming to a human hand or the like.

A second end of the handle may have a windpipe loop dimensioned and configured to engage around the windpipe of a big game animal to be gutted. The windpipe loop may be thin but strong cord such as nylon or other polymers, may be wire, cable, strong rope of any type, or may be a strap of leather, metal or the like.

The device may be extendible, for example by folding or telescoping.

In the body cavity of the big game animal is cut open from top to bottom of the pleural cavity, including breaking of the pelvis. This opens up the animal in a fairly traditional manner. However, at this point the windpipe of the animal is cut across, in the region of the neck. The windpipe loop is then placed over the end of the windpipe which remains attached to the visceral of the animal and the device of the invention is twisted repeatedly to tighten the windpipe loop into an very tight physical engagement with the windpipe. A heavy pull is exerted on the handle by the user, assisting in the removal of the visceral of the animal. In some cases, pulling of the device may be sufficient to substantially or partially remove the viscera, while in other cases, it may be necessary for the user to wield a knife with one hand while pulling on the handle. Even the latter case, the substantial pull the user may exert by means of the device makes the entire gutting process much easier than prior art methods involving two hands inside the body cavity of the animal.

Summary in Reference to Claims

It is therefore a first aspect, advantage, objective and embodiment of the invention to provide a big game dressing device for use on a big game windpipe, the big game dressing device comprising:
  a handle;
  the handle being made of a material having a tensile strength sufficient to withstand a tension of at least 10 pounds;
  the handle having first and second ends respectively proximal and distal;
  the first proximal end dimensioned and configured to accept a firm grip;
  the first proximal end having a grip attachment;
  the second proximal end having a windpipe loop secured thereto;
  the windpipe loop having a circumference dimensioned to accept such big game windpipe.

It is therefore a second aspect, advantage, objective and embodiment of the invention to provide a big game dressing device wherein the grip attachment further comprises:
  a thong loop having a circumference dimensioned to accept a human wrist.

It is therefore another aspect, advantage, objective and embodiment of the invention to provide a big game dressing device wherein the thong loop is one member selected from the group consisting of fabric rope, fabric strap, leather strap, and combinations thereof.

It is therefore another aspect, advantage, objective and embodiment of the invention to provide a big game dressing device wherein the first proximal end further comprises:
  a hole passing through the handle;
  the thong loop passing through the hole and being secured to the handle thereby.

It is therefore another aspect, advantage, objective and embodiment of the invention to provide a big game dressing device wherein the grip attachment further comprises:
  a cross-member firmly attached to the first proximal end.

It is therefore another aspect, advantage, objective and embodiment of the invention to provide a big game dressing device wherein the grip attachment further comprises:
  a knob firmly attached to the first proximal end.

It is therefore another aspect, advantage, objective and embodiment of the invention to provide a big game dressing device wherein the windpipe loop is one member selected from the group consisting of fabric rope, fabric strap, leather strap, wire, cable, metal straps, and combinations thereof.

It is therefore another aspect, advantage, objective and embodiment of the invention to provide a big game dressing device wherein the second distal end further comprises:
  a passage passing through the handle;
  the windpipe loop passing through the passage and being secured to the handle thereby.

It is therefore another aspect, advantage, objective and embodiment of the invention to provide a big game dressing device wherein the dimensioning and configuration of the first proximal end to accept a firm grip further comprises:
  providing the handle in an elongated shape having a circular cross section with a diameter in the range from 0.5 inch to 1.5 inch.

It is therefore another aspect, advantage, objective and embodiment of the invention to provide a big game dressing device wherein the handle material comprises wood.

It is therefore another aspect, advantage, objective and embodiment of the invention to provide a big game dressing device wherein the handle material comprises metal.

It is therefore another aspect, advantage, objective and embodiment of the invention to provide a big game dressing device wherein the handle material comprises polymer.

It is therefore another aspect, advantage, objective and embodiment of the invention to provide a big game dressing device wherein the handle comprises first and second telescoping sections.

It is therefore another aspect, advantage, objective and embodiment of the invention to provide a big game dressing device wherein the handle has a length in the range from 6 inches to 24 inches.

It is therefore yet another aspect, advantage, objective and embodiment of the invention to provide a method of dressing big game comprising the steps of:
  breaking the pelvis of the big game animal;
  cutting the epidermis and sternum of the big game animal from the pelvic area to the neck;
  cutting the windpipe of the big game animal;
  securing a loop around the windpipe of the big game animal, the loop attached to a second end of a strong handle having a first end dimensioned and configured to accept a firm grip,
  twisting the handle repeatedly to draw the loop tight about the windpipe;
  pulling strongly on the handle to withdraw the animal's entrails from the carcass while cutting connections between the entrails and the carcass.

| INDEX OF REFERENCE NUMERALS | |
|---|---|
| Big game dressing device | 100 |
| Handle | 102 |
| Second end | 104 |
| Attachment | 106 |
| Windpipe loop | 108 |
| First end | 124 |
| Grip attachment | 126 |
| Big game dressing device | 200 |
| Handle | 202 |
| Second end | 204 |
| Passage | 206 |
| Windpipe loop | 208 |
| Windpipe loop end | 210 |
| Passage terminal end | 212 |
| Block | 214 |
| Big game dressing device | 300 |
| Handle | 302 |
| Grip attachment hole | 322 |
| First end | 324 |
| Grip attachment | 326 |
| Width/diameter | 328 |
| Big game dressing device | 400 |
| Handle | 402 |
| First end (knob) | 424 |
| Grip attachment | 426 |
| Big game dressing device | 600 |
| Handle first part | 602a |
| Handle second part | 602b |
| Second end | 604 |
| Windpipe loop | 608 |
| First end | 624 |
| Grip attachment/thong loop | 626 |
| Securing device | 640 |
| Knurling | 642 |
| Handle | 702 |
| Windpipe loop | 708 |
| Grip attachment | 726 |
| Game animal | 750 |
| Primary incision | 752 |
| Severed windpipe end | 754 |

DETAILED DESCRIPTION

Figure 1:
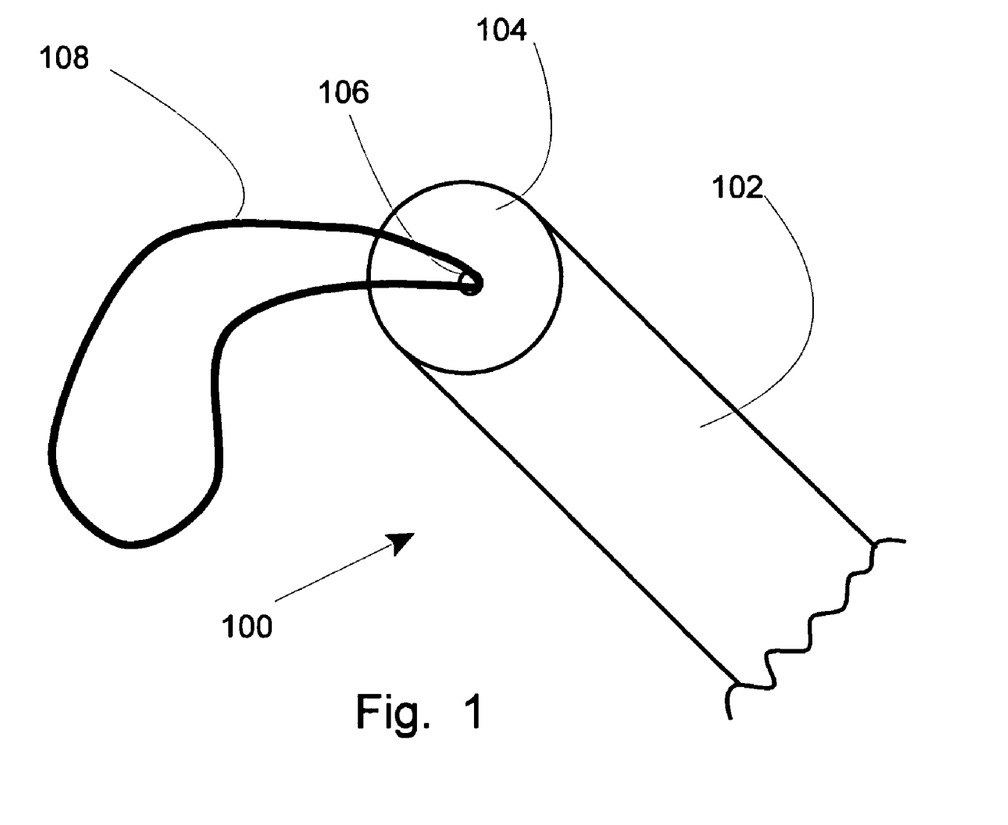
FIG. 1 is a partial end view of a second end of a first embodiment of the device, showing the wind pipe loop.
Figure 5:
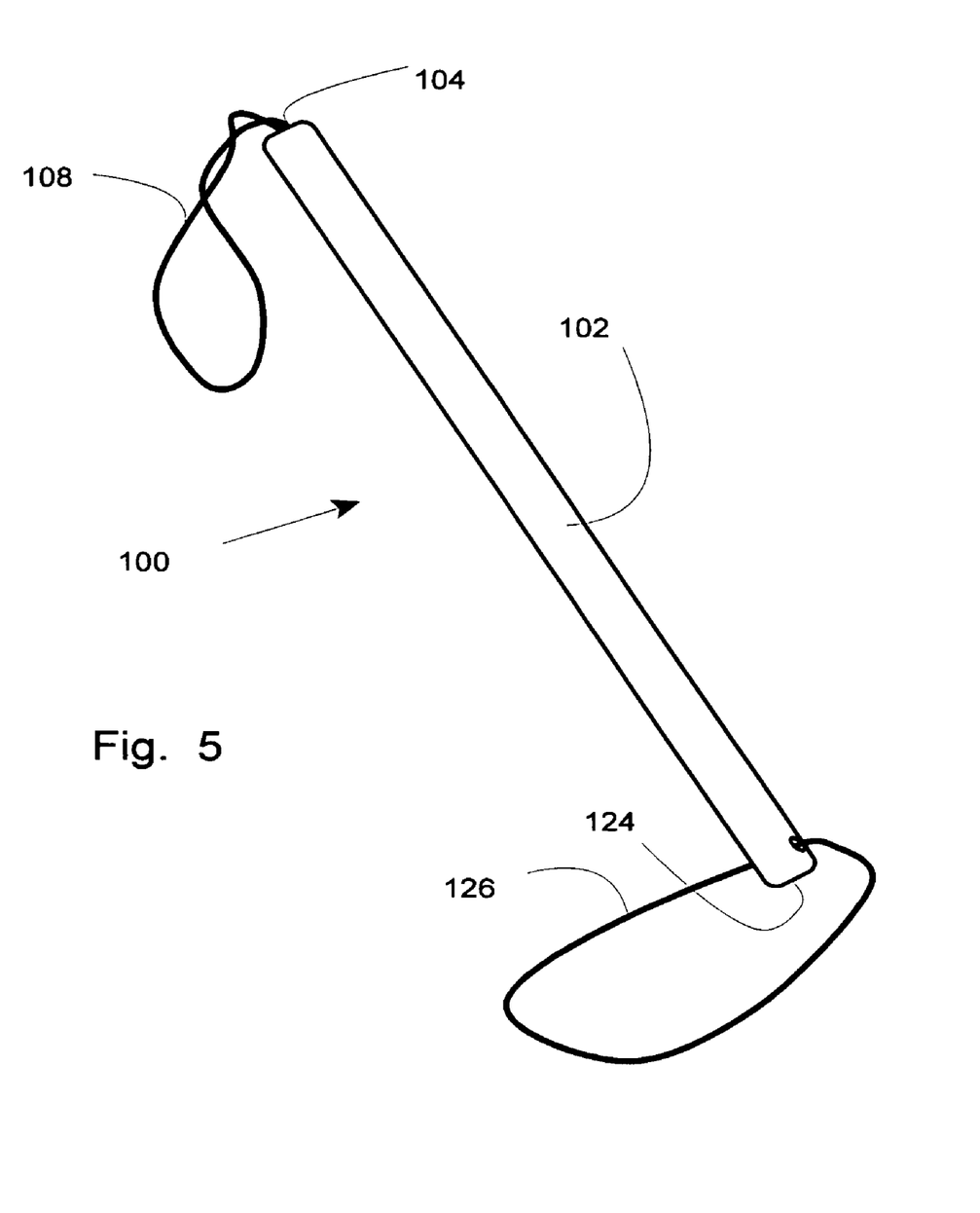
FIG. 5 is an orthogonal side view of the device showing both ends.

FIG. 5 is an orthogonal side view of the device showing both ends, while FIG. 1 is a partial end view of a second end of a first embodiment of the device, showing the wind pipe loop.

Big game dressing device 100 has a body/handle 102 which may in favored embodiments be dimensioned and configured to accept a strong grip from the human hand. Second end 104 may have attachment 106 to windpipe loop 108, a loop of strong flexible material which is dimensioned and configured to easily slip around the severed windpipe of a big game animal at a location inside the animal neck, after the hunter has cut open the neck and severed the windpipe. Testing has revealed that a windpipe loop which extends from second end 104 by a length of roughly 4 inches (roughly 10 centimeters) is appropriately dimensioned, resulting in a total loop circumference of roughly 8 inches (roughly 20 centimeters), not including any length of loop within the handle or attachment 106.

First end 124 may have a grip attachment 126 which may take the form of a wrist thong to slip around a hunter's wrist, or a grip, a handle, a knob or the like. The grip attachment may be dimensioned and configured to easily accept a human hand, for example, a wrist thong of roughly 5 inches in length has been found suitable, while a handle of roughly 6 inches in length has also been found suitable.

Figure 3:
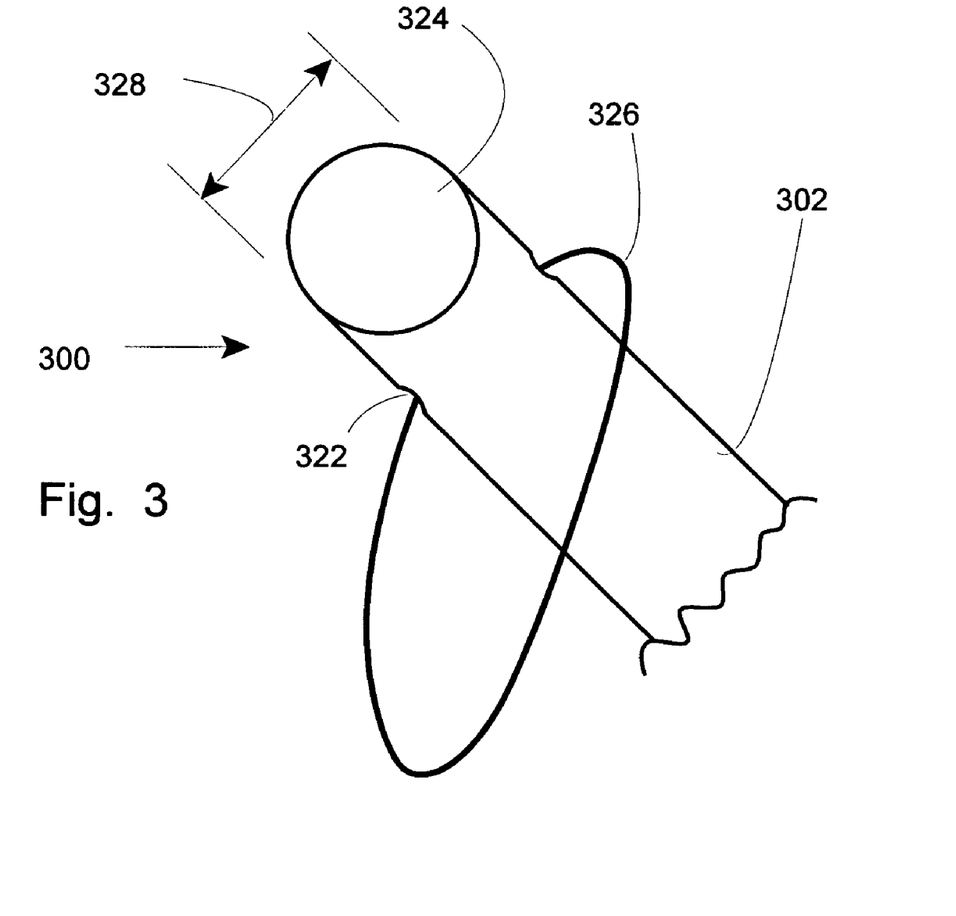
FIG. 3 is a partial end view of the first end of the device, showing details of a grip attachment.

FIG. 3 is a partial end view of the first end of the device, showing details of a grip attachment of big game dressing device 300. Handle 302 may have grip attachment hole 322 passing into or through first end 324, with grip attachment 326 secured by passing through the hole. Width/diameter 328 is of particular interest: the width of the device may in preferred embodiments be roughly 1 inch (roughly 2.5 centimeters) so as to allow for a strong sure human grip. The width may also vary to form knurls, knobs, or a formed hand grip in the shape of a grip for further grip.

Handle 100/300 should be of a material strong enough to resist a very strong pull, at least 50 pounds, more preferably 100 pounds, and even more preferably 180 pounds, a strength used in the presently preferred examples of the invention and verified by testing. One inch wood rods have been tested and found strong enough, however, polymers of high strength, metals, composites and the like may instead be used.

Figure 2:
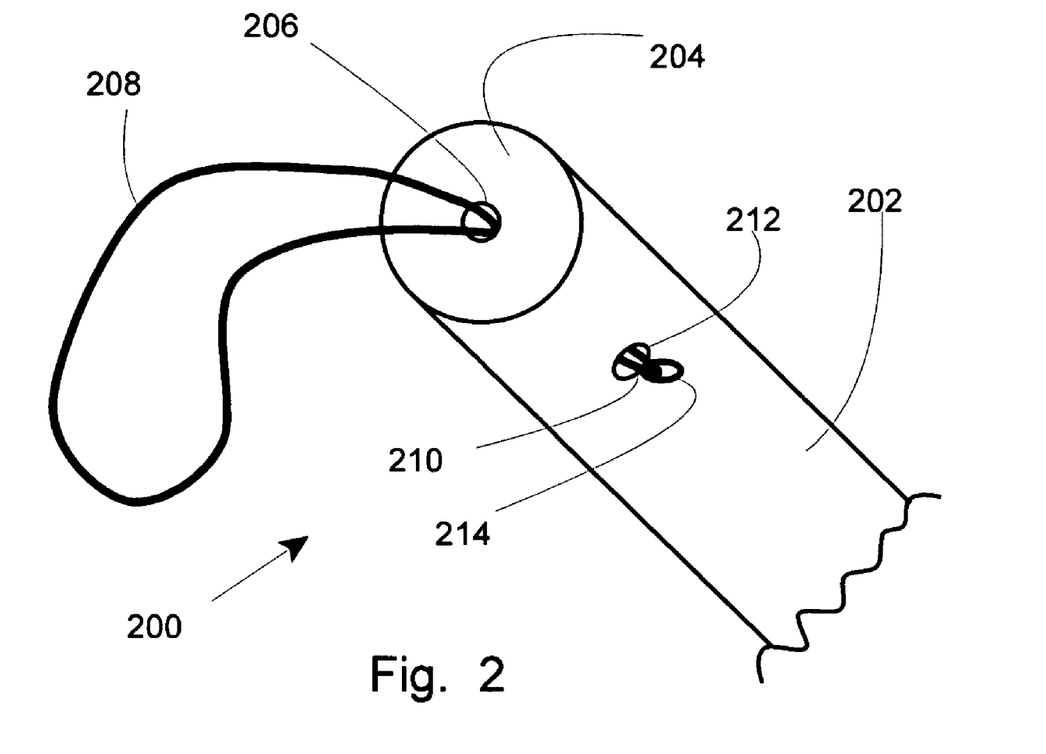
FIG. 2 is a partial end view of a second end of a second embodiment of the second end of the device, having a different attachment of wind pipe loop to handle.

FIG. 2 is a partial end view of a second end of a second embodiment of the second end of the device, having a different attachment of wind pipe loop to handle.

Big game dressing device 200 has handle 202 having second end 204 having passage 206 therethrough. Windpipe loop 208 may have windpipe loop end 210 extending into and through the passage and out the passage terminal end 212 to engage block 214, which may be a large knot in the loop end 210, a bead, washer, rod, plate, detent or the like.

Figure 4:
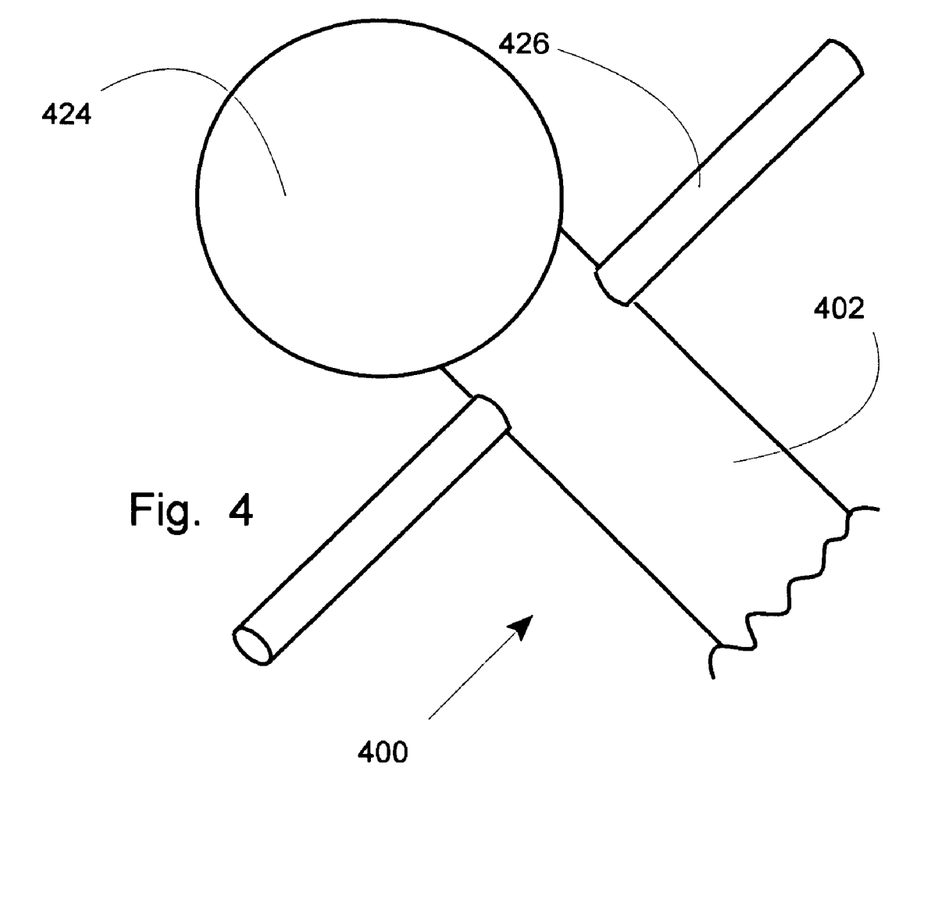
FIG. 4 is a partial end view of the first end of the device, showing an alternative embodiment of the first end.

FIG. 4 is a partial end view of the first end of the device, showing an alternative embodiment of the first end.

Big game dressing device 400 has handle 402 having first end 424 in turn having grip attachment 426, a rod shape which may be secured as shown at or near first end 424. The overall shape of handle 402 may thus become a "T" or "t" junction, or the handle may be offset to one side in the manner of a nightstick, may be shaped much like bicycle handlebars with grips, or may be located at or near the mid-point of the handle's length and so on. It will be seen that first end 424 may be a large knob to further assist in attaining a strong grip.

Figure 6:
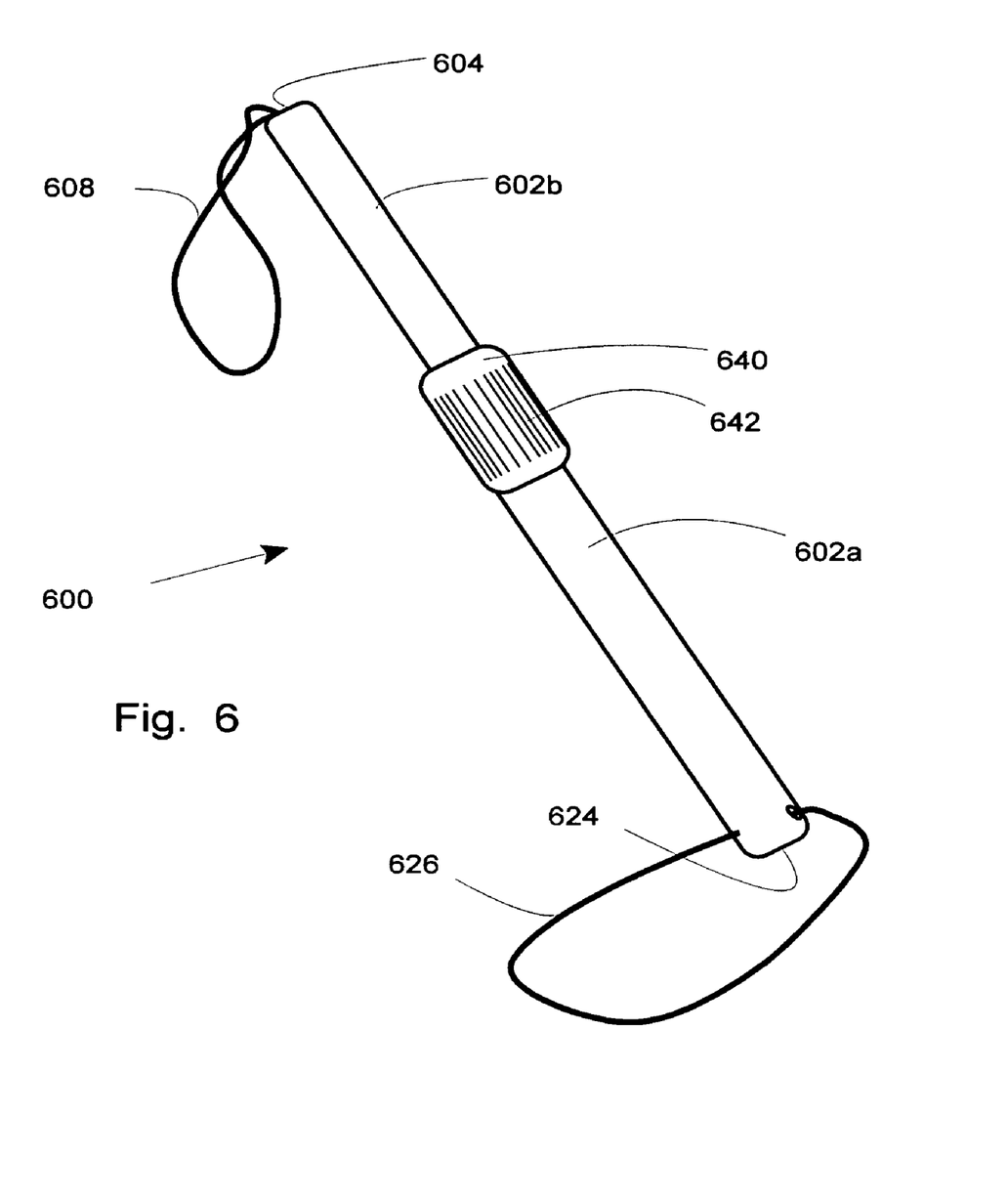
FIG. 6 is an orthogonal side view of the device showing a telescoping embodiment of the handle.

FIG. 6 is an orthogonal side view of the device showing a telescoping embodiment of the handle, having a length (not numbered) which may be varied.

Big game dressing device 600 has handle first part 602a and handle second part 602b secured together.

Second end 604 and windpipe loop 608 and first end 624 and grip attachment/thong loop 626 may be substantially as described previously.

Securing device 640 may attach together the first and second handle parts 602a, b or the two handle parts may attach directly together. The handle parts may extend telescopically, may swing, bend, etc. In either case, the objective is to provide a greater length for work and a compact shape for carrying through the back woods. The longer length makes for more convenient grips, greater lever arm and so on.

Knurling 642 on securing device 640 may allow it to be easily rotated into a tight physical lock with the two handle parts, thus securing the handle parts at a desired length. The knurling aids in achieving a tight grip, and may be used on other parts of the device such as the proximal first end for gripping. Other similar devices of securing the handle parts may be used. The handle may have a first shortened position, a second longer position and in embodiments may have further intermediate positions for user preference.

Figure 7:
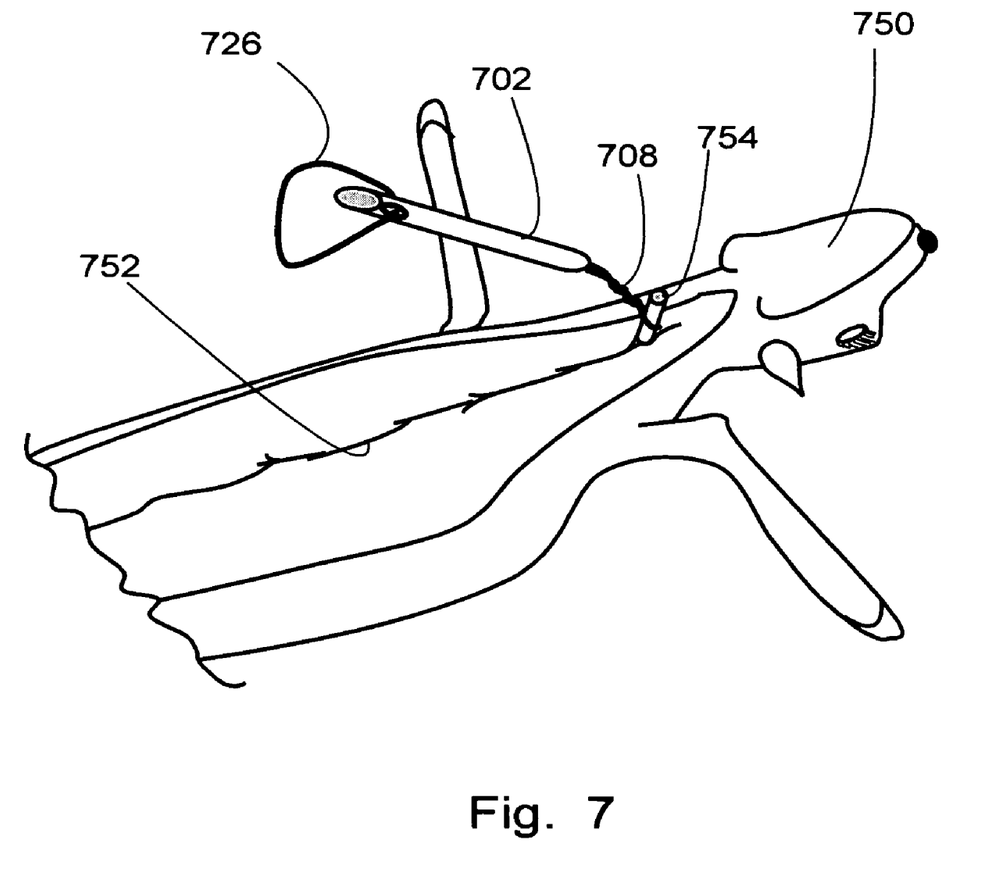
FIG. 7 is a perspective view of the device in use, showing the first several steps of the method of the invention completed with the gutting step about to be carried out.

In use, the following sequence of steps may be applied, and these steps may be viewed with reference to FIG. 7. In a realistic normal field dressing situation, the animal may be lying the ground, or, with good luck and available tree limbs overhead and rope, the animal may be suspended vertically.

First, a hunter will break the pelvis of the big game animal 750 so as to allow cutting the body cavity open from the very bottom to the very top (reference patents cited show further details of this known step).

Next, the hunter cuts the epidermis and sternum of the big game animal from the pelvic area to the neck, opening up the neck so as to access the windpipe and the entire length of the visceral cavity to access the entrails/innards/viscera/guts. Primary incision 752 shows the result of this step. (The cut requires a fair degree of strength and may not be entirely tidy in normal field dressing situations.)

The hunter then cuts the windpipe of the animal completely across inside of the neck, leaving a section which extends upwards towards the jaws and a section which extends downwards and is attached to the various internal organs of the animal via the lungs and stomach. This end will be the end to which the device is applied, severed windpipe end 754.

The windpipe loop 708 is then secured around the windpipe 754 of the big game animal, and the user assumes a firm grip on the handle 702, either near/at the second end, at the grip attachment 726 designed to aid such strong grips, or at another point along the handle's length. The user then twists the device as necessary to tighten the windpipe loop 708 until it digs deeply into the severed windpipe 754 and attains a strong physical engagement thereto: windpipe loop 708 is depicted in FIG. 7 heavily twisted into engagement with the severed windpipe 754, in contrast to the substantially open grip attachment loop 726.

The user may then either pull strongly on the handle and attempt to force out all the viscera by main force, without further cutting, or if the situation warrants, the user may pull on the handle with one hand while inserting a knife into the carcass with the other hand. As the viscera "hang together" in a package, the pull on the windpipe tends to clear the upper end of the viscera from the carcass down to any point of attachment such as a ligament or circulatory tube or the like, thus making cutting such attachments much simpler. In addition, the operation is much simpler as the hand which is clearing the viscera out of the way of the knife hand is the hand well outside the carcass on the handle of the device and testing reveals that self inflicted wounds are very greatly reduced.

Multiple person operations along the same lines may also be undertaken.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A big game dressing device for use on a big game windpipe, the big game dressing device comprising:
   a handle;
   the handle being made of a material having a tensile strength sufficient to withstand a tension of at least 100 pounds;
   the handle having first and second ends respectively proximal and distal;
   the first proximal end dimensioned and configured to accept a firm grip;
   the first proximal end having a grip attachment;
   the second proximal end having a windpipe loop secured thereto;
   the windpipe loop having a circumference dimensioned to accept such big game windpipe.

2. The big game dressing device of claim 1, wherein the grip attachment further comprises:
   a thong loop having a circumference dimensioned to accept a human wrist.

3. The big game dressing device of claim 2, wherein the thong loop is one member selected from the group consisting of fabric rope, fabric strap, leather strap, and combinations thereof.

4. The big game dressing device of claim 2, wherein the first proximal end further comprises:
   a hole passing through the handle;
   the thong loop passing through the hole and being secured to the handle thereby.

5. The big game dressing device of claim 1, wherein the grip attachment further comprises:
   a cross-member firmly attached to the first proximal end.

6. The big game dressing device of claim 1, wherein the grip attachment further comprises:
   a knob firmly attached to the first proximal end.

7. The big game dressing device of claim 1, wherein the windpipe loop is one member selected from the group consisting of fabric rope, fabric strap, leather strap, wire, cable, metal straps, and combinations thereof.

8. The big game dressing device of claim 7, wherein the second distal end further comprises:
   a passage passing through the handle;
   the windpipe loop passing through the passage and being secured to the handle thereby.

9. The big game dressing device of claim 1, wherein the dimensioning and configuration of the first proximal end to accept a firm grip further comprises:
   providing the handle in an elongated shape having a circular cross section with a diameter in the range from 0.5 inch to 1.5 inch.

10. The big game dressing device of claim 1, wherein the handle material comprises wood.

11. The big game dressing device of claim 1, wherein the handle material comprises metal.

12. The big game dressing device of claim 1, wherein the handle material comprises polymer.

13. The big game dressing device of claim 1, wherein the handle comprises first and second telescoping sections.

14. The big game dressing device of claim 1, wherein the handle has a length in the range from 6 inches to 24 inches.

15. A method of dressing big game comprising the steps of:
   breaking the pelvis of the big game animal;
   cutting the epidermis and sternum of the big game animal from the pelvic area to the neck;
   cutting the windpipe of the big game animal;
   securing a loop around the windpipe of the big game animal, the loop attached to a second end of a strong handle having a first end dimensioned and configured to accept a firm grip,
   twisting the handle repeatedly to draw the loop tight about the windpipe;
   pulling strongly on the handle to withdraw the animal's entrails from the carcass while cutting connections between the entrails and the carcass.

* * * * *